United States Patent
Maitra et al.

(10) Patent No.: US 10,623,932 B2
(45) Date of Patent: Apr. 14, 2020

(54) DETECTING TRIGGER CONDITIONS TO DYNAMICALLY UPDATE A MODEL BASED ON SENSOR DATA IN A FOG COMPUTING ENVIRONMENT

(71) Applicant: Accenture Global Solutions Limited, Dublin (IE)

(72) Inventors: Anutosh Maitra, Bangalore (IN); Nataraj Kuntagod, Bangalore (IN); Senthil Kumar Kumaresan, Bangalore (IN); Satya Sai Srinivas, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 248 days.

(21) Appl. No.: 15/822,883

(22) Filed: Nov. 27, 2017

(65) Prior Publication Data
US 2018/0184232 A1    Jun. 28, 2018

(30) Foreign Application Priority Data
Dec. 23, 2016  (IN) .............................. 201641044000

(51) Int. Cl.
*H04W 4/70* (2018.01)
*H04L 29/08* (2006.01)
(Continued)

(52) U.S. Cl.
CPC ............ *H04W 4/70* (2018.02); *H04L 67/125* (2013.01); *H04W 4/023* (2013.01); *H04W 4/38* (2018.02); *H04W 84/18* (2013.01)

(58) Field of Classification Search
CPC ..... G06F 3/0484; H04L 67/125; H04L 67/22; A61B 2560/0223; A61B 2562/0204;
(Continued)

(56) References Cited

U.S. PATENT DOCUMENTS 9,191,442 B2   11/2015   Kuntagod et al.
2013/0006151 A1   1/2013   Main et al.
(Continued)

OTHER PUBLICATIONS

Ivan Stojmenovic et al., "The Fog Computing Paradigm: Scenarios and Security Issues", Proceedings of the 2014 Federate Conference on Computer Science and Information Systems, ACSIS, vol. 2, 2014, 8 pages.
(Continued)

*Primary Examiner* — Elias Desta
(74) *Attorney, Agent, or Firm* — Harrity & Harrity, LLP (57) ABSTRACT

A device may receive sensor data from one or more sensor devices. The device may detect a trigger condition, that triggers an update to a model used to analyze the sensor data, based on receiving the sensor data. The trigger condition may include at least one of: a change in a type of data included in the sensor data, a change in an entity being monitored in association with the sensor data, or a change in a frequency with which the sensor data is received from the one or more sensor devices. The device may transmit a request to update the model based on detecting the trigger condition. The device may receive an updated model based on transmitting the request to update the model. The device may apply the updated model to the sensor data and/or subsequent sensor data received from the one or more sensor devices.

20 Claims, 4 Drawing Sheets

(51) Int. Cl.
*H04W 84/18* (2009.01)
*H04W 4/02* (2018.01)
*H04W 4/38* (2018.01)

(58) Field of Classification Search
CPC ........... A61B 2562/029; A61B 5/0024; H04W 84/18; H04W 4/38; H04W 4/70
See application file for complete search history.

(56) References Cited

U.S. PATENT DOCUMENTS

| | | | |
|---|---|---|---|
| 2013/0245401 A1 | 9/2013 | Estes et al. | |
| 2013/0338630 A1 | 12/2013 | Agrawal et al. | |
| 2014/0222813 A1* | 8/2014 | Yang | G06F 16/95 707/736 |
| 2015/0371522 A1 | 12/2015 | Mravyan et al. | |
| 2016/0183792 A1 | 6/2016 | Koehler et al. | |
| 2016/0287076 A1 | 10/2016 | Pradeep et al. | |
| 2017/0257767 A1* | 9/2017 | Zhao | H04W 4/70 |

OTHER PUBLICATIONS

Salekul Islam et al., "Network Edge Intelligence for the Emerging Next-Generation Internet", Future Internet, 201, 21 pages.
Aapo Markkanen, "Competitive Edge from Edge Intelligence IoT Analytics Today and in 2020", ABIresearch, May 2015, 10 Pages.
Joe McKendrick, "Fog Computing: a New IoT Architecture", RTInsights.com, https://www.rtinsights.com/what-is-fog-computing-open-consortium/, Mar. 22, 2016 5 pages.
Chris Raphael, "IoT Architectures for Edge Analytics", RTInsights.com, https://www.rtinsights.com/iot-architectures-for-edge-analytics/, Nov. 17, 2015.
Imran Akbar, "Intelligence at the network's edge—defining the future of wireless networking architecture", NETWORKWORLD, https://www.networkworld.com/article/2194164/tech-primers/intelligence-at-the-network-s-edge--defining-the-future-of-wireless-networking-archit.html, Nov. 9, 2010, 5 pages.
Jeff Carkhuff, "Realizing Smart Grid Potential With the Power of Edge Intelligence"; https://www.greentechmedia.com/articles/read/realizing-smart-grid-potential-with-the-power-of-edge-intelligence#gs.PgsAcjk, Dec. 17, 2014, 5 pages.
Extended European Search Report corresponding to EP 17 208 285.1, dated May 7, 2018, 9 pages.

* cited by examiner

DETECTING TRIGGER CONDITIONS TO DYNAMICALLY UPDATE A MODEL BASED ON SENSOR DATA IN A FOG COMPUTING ENVIRONMENT

RELATED APPLICATION

This application claims priority under 35 U.S.C. § 119 to Indian Patent Application No. 201641044000, filed on Dec. 23, 2016, the content of which is incorporated by reference herein in its entirety.

BACKGROUND

The Internet of things (IoT) may refer to a network of devices that interact without human intervention. In some cases, an IoT device (e.g., a sensor) may have reduced processing and/or storage capabilities, and may rely on another device in the network to perform resource-intensive tasks (e.g., expensive processing requests, bulk data storage, etc.).

SUMMARY

In some implementations, a device may include one or more processors to receive sensor data from one or more sensor devices. The one or more processors may detect a trigger condition that triggers an update to a model used to analyze the sensor data, based on receiving the sensor data. The trigger condition may include at least one of: a change in a type of data included in the sensor data, a change in an entity being monitored in association with the sensor data, or a change in a frequency with which the sensor data is received from the one or more sensor devices. The one or more processors may transmit a request to update the model based on detecting the trigger condition. The one or more processors may receive an updated model based on transmitting the request to update the model. The one or more processors may apply the updated model to the sensor data and/or subsequent sensor data received from the one or more sensor devices.

In some implementations, a method may include receiving, by a device, sensor data from a sensor device. The method may include detecting, by the device, a trigger condition that triggers an update to a model used to analyze the sensor data, based on receiving the sensor data. The trigger condition may include at least one of: a change in a type of data included in the sensor data, a change in a frequency with which the sensor data is received from the sensor device, or a change in an entity being monitored in association with the sensor data. The method may include causing, by the device, the model to be updated based on detecting the trigger condition. The method may include applying, by the device, the updated model to the sensor data and/or subsequent sensor data. The method may include performing, by the device, one or more actions based on applying the model.

In some implementations, a non-transitory computer-readable medium may store one or more instructions that, when executed by one or more processors, cause the one or more processors to receive sensor data from one or more sensor devices. The one or more instructions may cause the one or more processors to detect a trigger condition, that triggers an update to a model used to analyze the sensor data, based on receiving the sensor data. The trigger condition may include at least one of: a change in a type of data included in the sensor data, a change in an entity being monitored in association with the sensor data, or a change in a frequency with which the sensor data is received from the one or more sensor devices. The one or more instructions may cause the one or more processors to obtain an updated model based on detecting the trigger condition. The one or more instructions may cause the one or more processors to apply the updated model to the sensor data and/or subsequent sensor data received from the one or more sensor devices.

DETAILED DESCRIPTION

The following detailed description of example implementations refers to the accompanying drawings. The same reference numbers in different drawings may identify the same or similar elements.

Fog computing may refer to a decentralized network architecture where devices near an end-user (e.g., edge nodes) carry out processing and/or data storage capabilities that, in a more traditional network architecture, may be carried out by a cloud server (e.g., a network utilizing cloud computing). For example, in a network with a more traditional architecture, a sensor device may transmit sensor data to a cloud server, and the cloud server may analyze (e.g., process, store, monitor, etc.) the sensor data. In a network with a decentralized architecture, a sensor device may transmit sensor data to an edge node that is in close physical proximity to the sensor device, and the edge node may analyze the sensor data, while only periodically transmitting the sensor data to a cloud server. In some cases, the edge node may use a model (e.g., a conceptual model, a data model, a logical model, etc.) to analyze the sensor data in a particular manner. However, network changes that are not accounted for by the model (e.g., a sensor device may be updated to measure a different parameter, to measure for a different entity, etc.) may cause the model to analyze the sensor data inaccurately or may cause the model to be unable to analyze the sensor data.

Implementations described herein allow an edge node to analyze sensor data using a model, detect sensor data that is different from that which the model is configured to analyze, and dynamically update the model (e.g., by communicating with a cloud server) based on detecting changes to the sensor data. By dynamically updating the model based on changes to the sensor data, the edge node efficiently utilizes network resources. For example, the edge node may process and/or store sensor data when the sensor data can be analyzed by the model, and the edge node may transmit processing and/or storage requests to a cloud server when the sensor data cannot be analyzed by the model.

Figure 1:
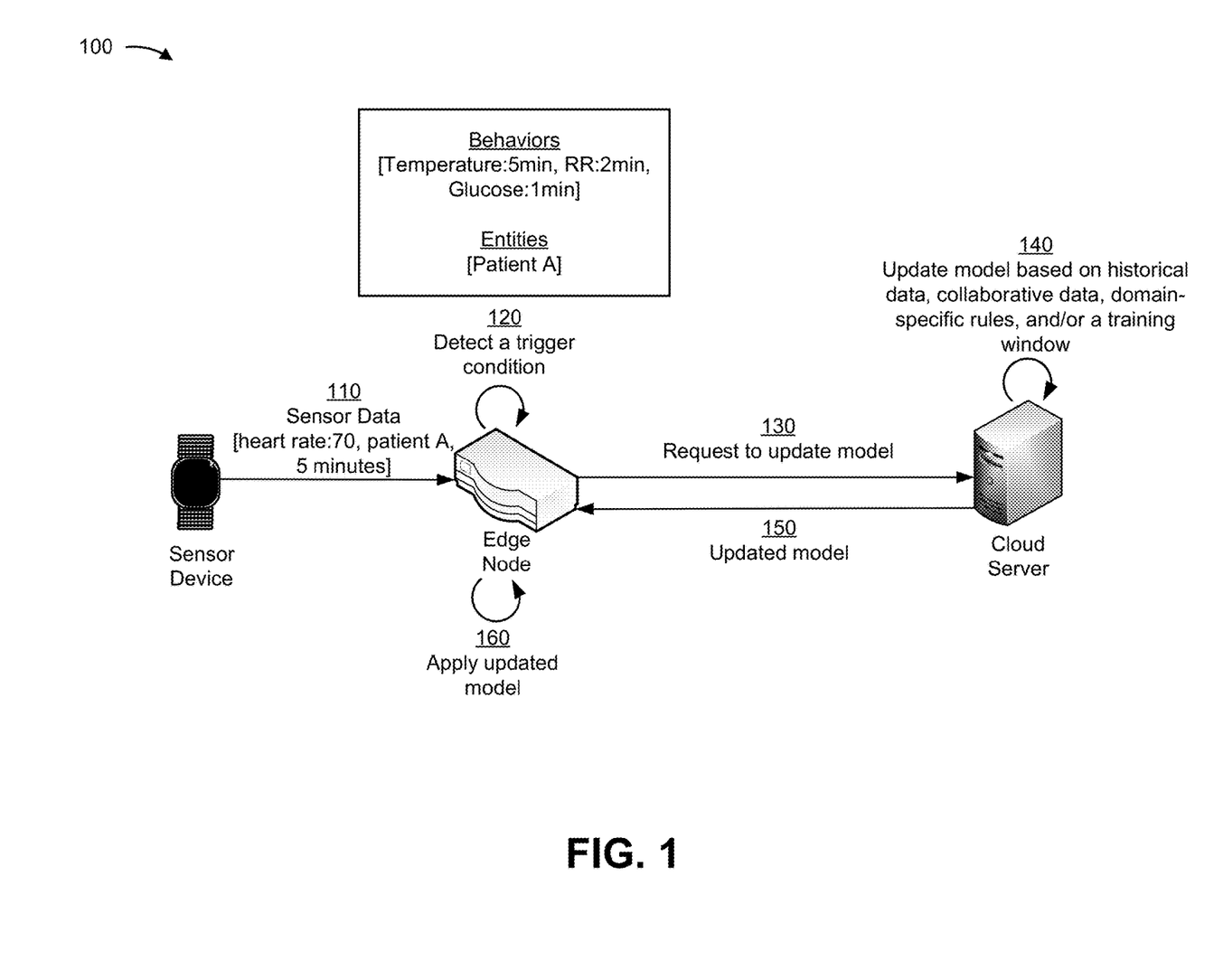
FIG. 1 is a diagram of an overview of an example implementation described herein.

FIG. 1 is a diagram of an overview of an example implementation 100 described herein. For FIG. 1, assume a decentralized IoT system includes a sensor device (e.g., shown as a smart watch), an edge node, and a cloud server, and that the decentralized IoT system dynamically analyzes sensor data using a model. Further assume that the model is configured to analyze sensor data for one entity (e.g., patient A), that the sensor data includes information relating to three measureable parameters of the human body (e.g., shown as body temperature, which is measured every five minutes, respiratory rate (RR), which is measured every two minutes, and glucose level, which is measured every one minute).

As shown in FIG. 1, and by reference number 110, the edge node may receive the sensor data from the sensor device, and the sensor data may include information that identifies a parameter measurement (e.g., a heart rate of 70 beats per minute), information that identifies an entity associated with the parameter (e.g., patient A), information that identifies a frequency at which to measure the parameter (e.g., a heart rate may be measured every 5 minutes), or the like.

As shown by reference number 120, the edge node may detect a trigger condition by detecting a change in the sensor data. For example, the model applied by the edge node may analyze parameters of body temperature, respiratory rate, and glucose level, and receiving sensor data that includes information identifying a heart rate may indicate a change in the sensor data. In this case, the model applied by the edge node may be insufficient to analyze the information identifying the heart rate, which, as shown by reference number 130, may cause the edge node to transmit, to a cloud server, a request to update the model. Furthermore, the edge node may increase a frequency at which the sensor data is transmitted to the cloud server, which may provide the cloud server with additional sensor data that can be used to update the model faster than providing sensor data at a lower frequency (e.g., the edge node may request, from the sensor device, sensor data every minute instead of every five minutes). While the trigger condition is described as a change in sensor data for the purpose of FIG. 1, in some implementations, the trigger condition may include a change in the entity, a change in the frequency with which the edge node receives sensor data from sensor device(s), and/or the like.

As shown by reference number 140, the cloud server may update the model based on historical data, collaborative data, a set of domain-specific rules, a training window, and/or the like, as described in more detail elsewhere herein. For example, the cloud server may update the model with information relating to monitoring a heart rate by searching a data structure for historical data relating to patient A (e.g., to determine if patient A has a history of past heart rate measurements). If historical data is not found, the cloud server may search the data structure for collaborative data relating to patients with similar characteristics (e.g., to obtain heart rate information regarding patients of similar age, health, demographics, etc.).

Additionally, or alternatively, the cloud server may verify the accuracy of the sensor data used to update the model by comparing the sensor data received from the edge node to the domain-specific rules. For example, a domain-specific rule relating to monitoring a heart rate may provide a range of human heart rates, and a heart rate level outside of the range may indicate an error or an improper measurement, and may not be used to update the model. In some implementations, a domain-specific rule may include a constraint and/or function to be satisfied before updating the model (e.g., a time constraint in an industrial or manufacturing context, or the like). Furthermore, the cloud server may determine a training window, which may indicate a time period to be used to train (e.g., update) the model. In some cases, the cloud server may receive frequent requests to update the model. This may indicate to the cloud server that the model needs to be updated quickly. In other cases, the cloud server may receive infrequent requests to update the model, and this may indicate to the cloud server that the model does not need to be updated quickly. The cloud server may adjust the training window accordingly. In this way, the cloud server conserves network resources by increasing a frequency at which sensor data is received only when the cloud server regularly receives requests to update the model.

As shown by reference number 150, the edge node may receive, from the cloud server, the updated model. For example, the edge node may receive the updated model, which may include one or more functions capable of analyzing the sensor data. As shown by reference number 160, the edge node may apply the updated model to the sensor data and/or to subsequent sensor data received from the sensor device, which may allow the edge node to properly analyze the sensor data. By using the cloud server to update the model while continuing to analyze the sensor data that coincides with the current model, the edge node conserves processing resources and/or memory resources.

As indicated above, FIG. 1 is provided merely as an example. Other examples are possible and may differ from what was described with regard to FIG. 1. For example, while implementations described in FIG. 1 involve updating a model, other implementations may involve generating a new model. Additionally, or alternatively, while the decentralized IoT system described in FIG. 1 uses a sensor device, an edge node, and a cloud server, other implementations may include multiple sensor devices (e.g., hundreds, thousands, or billions of sensor devices), multiple edge nodes, and/or multiple cloud servers. In practice, a particular edge node may process thousands, millions, billions, trillions, or more instances of sensor data. Implementations are described herein as using particular types of sensor data. In practice, however, other types of sensor data may be used.

Figure 2:
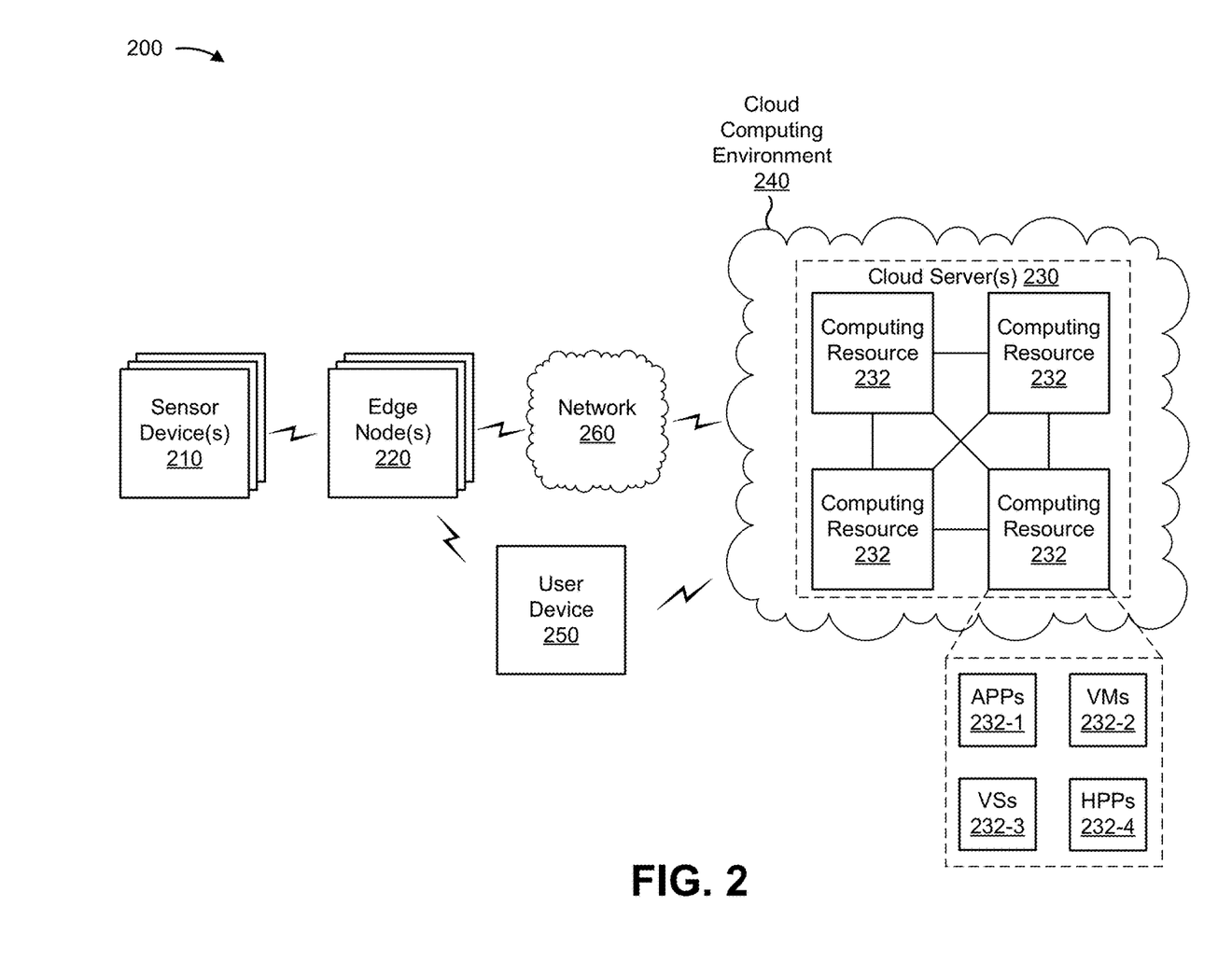
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of sensor devices 210, a set of edge nodes 220, a set of cloud servers 230 hosted within a cloud computing environment 240, a user device 250, and a network 260. Devices of environment 200 may interconnect via wired connections, wireless connections, or a combination of wired and wireless connections.

Sensor device 210 includes one or more devices capable of detecting and/or measuring sensor data, and transmitting the sensor data to edge node 220. In some implementations, sensor device 210 may include a heart rate monitor, a blood pressure sensor, a glucose monitor, a pulse monitor, an accelerometer, a pedometer, a gyroscope, a heat flux sensor, a skin conductivity sensor, a temperature sensor (e.g., a skin temperature sensor, an air temperature sensor, etc.), a calorie monitor, a sleep monitor, a motion sensor, a moisture sensor (e.g., a perspiration sensor), a chemical sensor or chemical compound sensor (e.g., to measure oxygen, carbon dioxide, lactate, testosterone, cortisol, glucose, glucagon, glycogen, insulin, starch, free fatty acid, triglycerides, monoglycerides, glycerol, pyruvate, lipids, other carbohydrates, ketone bodies, choline), a microphone (e.g., to detect noises from the stomach, a burp, passing gas, noises from a bathroom, etc.), and/or the like. Additionally, or alternatively, sensor device 210 may include a sensor to measure sensor data associated with a physical environment, such as a geographic location, a speed, an acceleration, a time of day, an amount of sunlight, an air temperature level, a humidity level, an oxygen level, a carbon monoxide level, a moisture level, a wind level, and/or the like. In some implementations, sensor device 210 may be configured to automatically transmit the sensor data to edge node 220 after detecting and/or measuring a parameter, after detecting and/or measuring a set of parameters (i.e., to transmit a batch of the sensor data), or at a scheduled time.

Edge node 220 includes one or more devices capable of receiving, detecting, analyzing (e.g., storing, generating, processing, etc.) and/or providing sensor data. For example, edge node 220 may include a router, a gateway, a set-top box, an access point, a switch, a server, a desktop computer, a laptop computer, or a similar type of device. In some implementations, edge node 220 may include a node in a fog computing environment. In some implementations, edge node 220 may apply a model to sensor data received from sensor device 210, may detect a trigger condition associated with the sensor data, and may transmit a request, to cloud server 230, to update the model.

Cloud server 230 includes one or more devices capable of receiving, analyzing, and/or providing sensor data. For example, cloud server 230 may include a server, a group of servers, a desktop computer, a laptop computer, or the like. In some implementations, cloud server 230 may store historical data and/or collaborative data, data indicating of a set of domain-specific rules, data that may be used to determine a training window (e.g., a period during which to train a model), or the like. Additionally, or alternatively, cloud server 230 may use the stored data to update a model.

Cloud computing environment 240 includes an environment that hosts cloud server 230. Cloud computing environment 240 may provide computation, software, data access, storage, and/or other services that do not require end-user knowledge of a physical location and configuration of system(s) and/or device(s) that host cloud server 230. As shown, cloud computing environment 240 may include a group of computing resources 232 (referred to collectively as "computing resources 232" and individually as "computing resource 232").

Computing resource 232 includes one or more personal computers, workstation computers, server devices, or another type of computation and/or communication device. In some implementations, computing resource 232 may host cloud server 230. The cloud resources may include compute instances executing in computing resource 232, storage devices provided in computing resource 232, data transfer devices provided by computing resource 232, etc. In some implementations, computing resource 232 may communicate with other computing resources 232 via wired connections, wireless connections, or a combination of wired and wireless connections.

As further shown in FIG. 2, computing resource 232 includes a group of cloud resources, such as one or more applications ("APPs") 232-1, one or more virtual machines ("VMs") 232-2, virtualized storage ("VSs") 232-3, one or more hypervisors ("HYPs") 232-4, or the like.

Application 232-1 includes one or more software applications that may be provided to or accessed by edge node 220. Application 232-1 may eliminate a need to install and execute the software applications on edge node 220. For example, application 232-1 may include software associated with cloud server 230 and/or any other software capable of being provided via cloud computing environment 240. In some implementations, one application 232-1 may send/receive information to/from one or more other applications 232-1, via virtual machine 232-2.

Virtual machine 232-2 includes a software implementation of a machine (e.g., a computer) that executes programs like a physical machine. Virtual machine 232-2 may be either a system virtual machine or a process virtual machine, depending upon use and degree of correspondence to any real machine by virtual machine 232-2. A system virtual machine may provide a complete system platform that supports execution of a complete operating system ("OS"). A process virtual machine may execute a single program, and may support a single process. In some implementations, virtual machine 232-2 may manage infrastructure of cloud computing environment 240, such as data management, synchronization, or long-duration data transfers. In some implementations, computing resource 232 may include one or more physical servers instead of or in addition to one or more virtual machines 232-2.

Virtualized storage 232-3 includes one or more storage systems and/or one or more devices that use virtualization techniques within the storage systems or devices of computing resource 232. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 232-4 provides hardware virtualization techniques that allow multiple operating systems (e.g., "guest operating systems") to execute concurrently on a host computer, such as computing resource 232. Hypervisor 232-4 may present a virtual operating platform to the guest operating systems, and may manage the execution of the guest operating systems. Multiple instances of a variety of operating systems may share virtualized hardware resources.

User device 250 includes one or more devices capable of communicating with edge node 220. For example, user device 250 may include a computing device, such as a desktop computer, a laptop computer, a mobile device (e.g., a mobile phone), a tablet computer, a wearable computer (e.g., a smart watch, a smart band, or a smart pair of eyeglasses), a server, or the like. In some implementations, user device 250 may receive sensor data from edge node 220, and/or may transmit the sensor data to cloud server 230.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices and/or networks (e.g., one or more devices) of environment 200 may perform one or more functions described as being performed by another set of devices and/or networks of environment 200.

Figure 3:
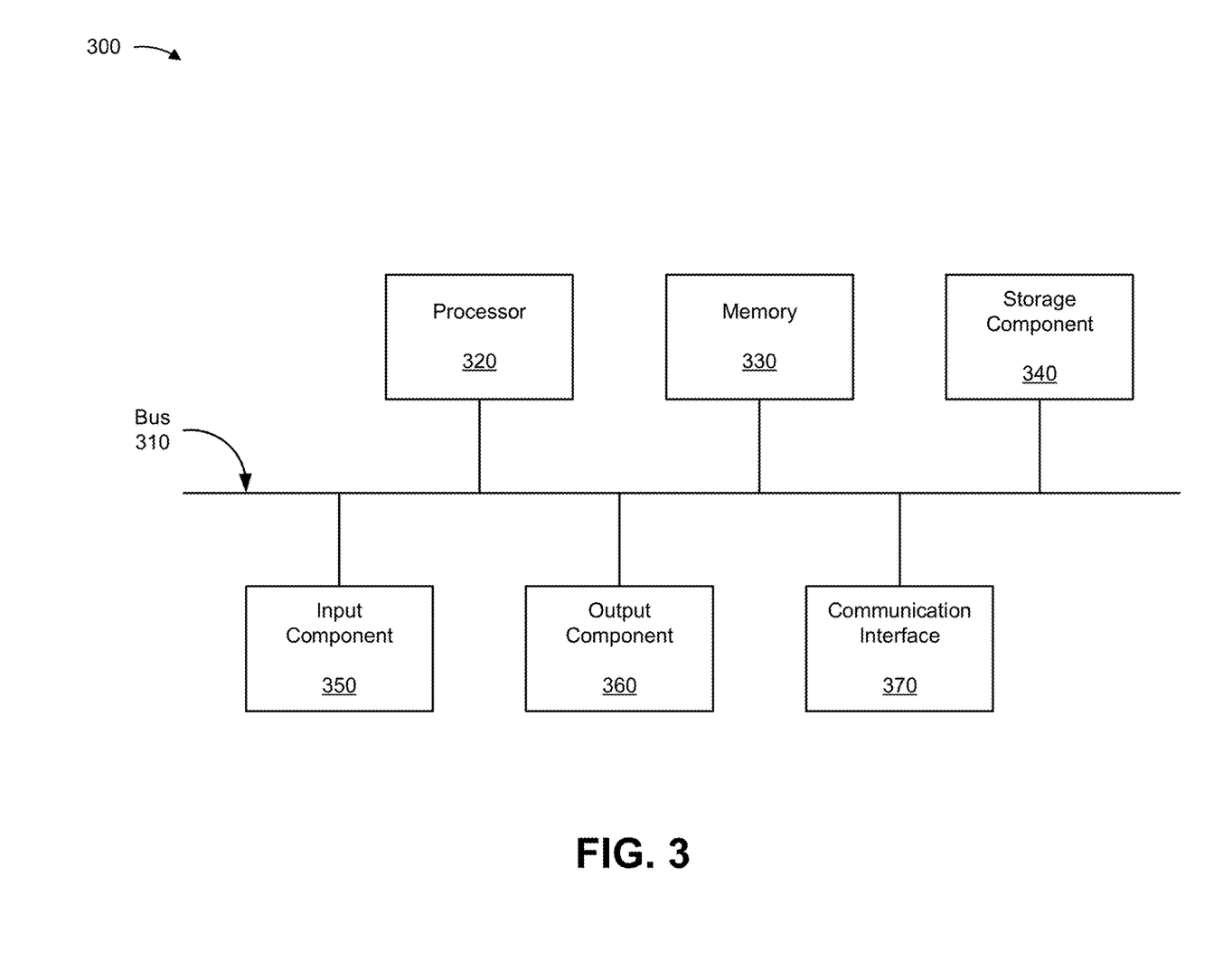
FIG. 3 is a diagram of example components of one or more devices of FIG. 2.

FIG. 3 is a diagram of example components of a device 300. Device 300 may correspond to sensor device 210, edge node 220, cloud server 230, computing resource 232, and/or user device 250. In some implementations, sensor device 210, edge node 220, cloud server 230, computing resource 232, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
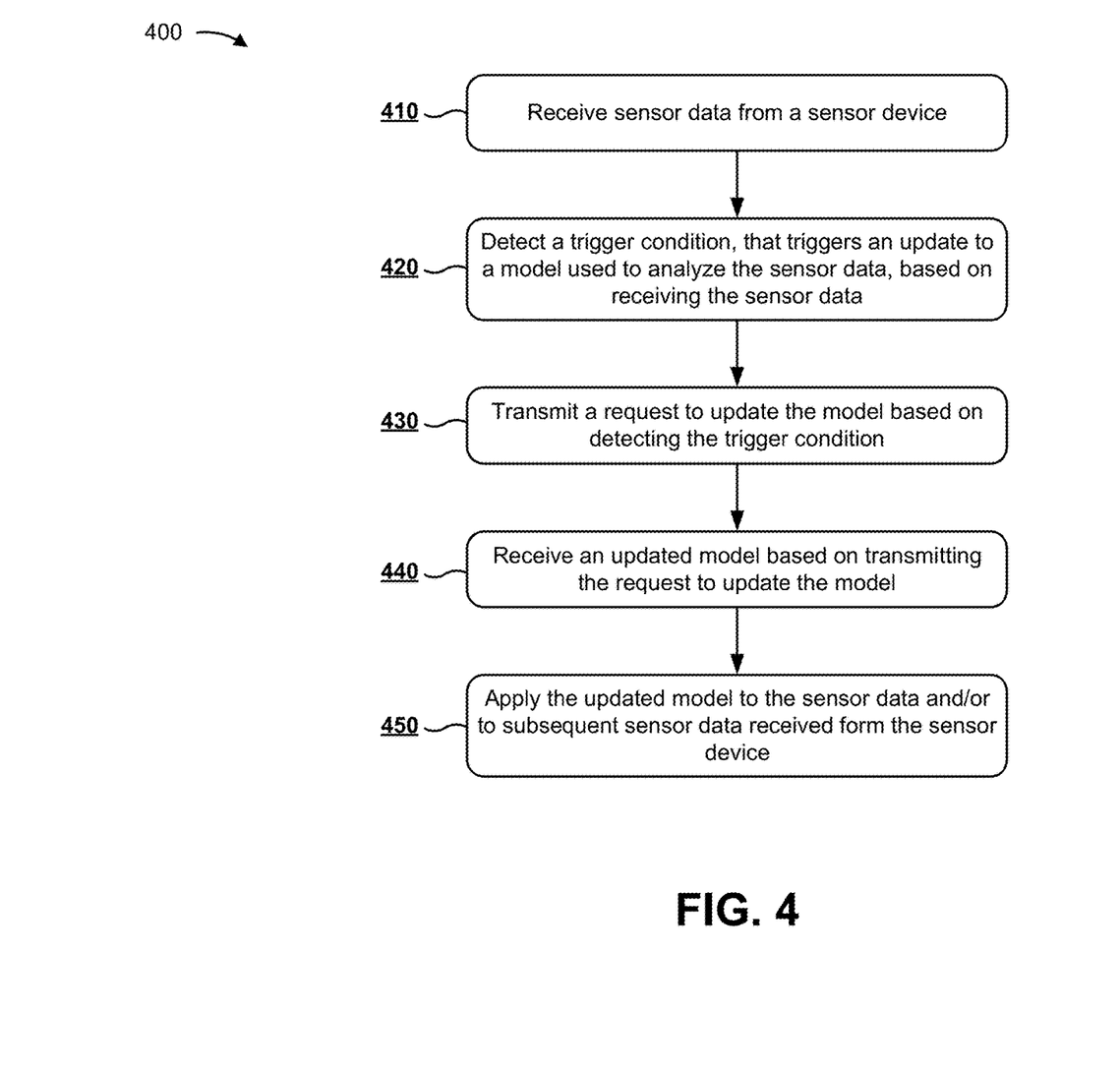
FIG. 4 is a flow chart of an example process for dynamically updating a model based on detecting a trigger condition.

FIG. 4 is a flow chart of an example process 400 for dynamically updating a model based on detecting a trigger condition. In some implementations, one or more process blocks of FIG. 4 may be performed by edge node 220. In some implementations, one or more process blocks of FIG. 4 may be performed by another device or a group of devices separate from or including edge node 220, such as sensor device 210 and/or cloud server 230.

As shown in FIG. 4, process 400 may include receiving sensor data from a sensor device (block 410). For example, edge node 220 may receive, from sensor device 210, sensor data as part of a decentralized internet of things (IoT) system. The sensor data may include information that identifies a parameter (e.g., a parameter of a person, such as a heart rate or a blood sugar level; a parameter of a physical environment, such as a humidity level or an amount of sunlight; a parameter such as a frequency at which the sensor data is to be measured; a parameter relating to an amount of sensor data to be received at one time; a parameter of a device; a parameter relating to a time of delivery of the sensor data; etc.), information that identifies an entity associated with the sensor data (e.g., a patient receiving a heart rate measurement, an owner of a device being monitored, etc.), information that identifies a device associated with the sensor data (e.g., a device identifier that identifies sensor device 210), a time stamp associated with the sensor data, or the like.

In some implementations, edge node 220 may receive sensor data as part of a decentralized IoT system. For example, the decentralized IoT system may include one or more devices (e.g., one or more sensor devices 210, one or more edge nodes 220, one or more cloud servers 230, etc.) to dynamically detect, measure, analyze, and transmit sensor data in particular environments. As an example, sensor device 210 may transmit sensor data to edge node 220, and edge node 220 may apply a model to analyze the sensor data in a particular manner. In this case, edge node 220 may transmit the sensor data and/or the results of analyzing the sensor data to cloud server 230. Additionally, or alternatively, edge node 220 may transmit the sensor data to user device 250, and user device 250 may transmit the sensor data to cloud server 230.

As further shown in FIG. 4, process 400 may include detecting a trigger condition, that triggers an update to a model used to analyze the sensor data, based on receiving the sensor data (block 420). For example, edge node 220 may detect a trigger condition that triggers an update to a model. The trigger condition may include, for example, a change in a parameter associated with sensor device 210, the sensor data, and/or the delivery of the sensor data, a change in an entity being monitored in association with the sensor data, and/or the like. In some cases, the model that edge node 220 applies to the sensor data may analyze the sensor data in a particular manner (e.g., the model may be configured to analyze a body temperature), and the change in the sensor data may cause the model to be unable to analyze the sensor data (e.g., the model may not be configured to analyze a heart rate).

In some implementations, edge node 220 may detect a trigger condition by detecting a change in a type of data (e.g., a parameter) included in the sensor data. For example, edge node 220 may compare a type of data included in the sensor data (e.g., a heart rate level, a glucose level, etc.) and one or more types of data associated with a model (e.g., a heart rate level, a glucose level, etc.), and edge node 220 may detect the change in the type of data based on the comparison. As an example, edge node 220 may receive sensor data that includes a type of data associated with a heart rate. In this case, if edge node 220 is applying a model to monitor a different type of data, such as a glucose level, then edge node 220 may determine that the trigger condition is detected. Additionally, or alternatively, edge node 220 may detect a change in a type of data included in the sensor data when a type of data is removed from the sensor data.

Additionally, or alternatively, edge node 220 may detect a trigger condition by detecting a change in a frequency (e.g., a parameter) with which the sensor data is received. For example, edge node 220 may determine a time interval associated with receiving the sensor data, and may determine that the time interval satisfies a threshold. In this case, edge node 220 may detect the change in the frequency based on determining that the time interval satisfies the threshold. In some cases, edge node 220 may determine an average interval over a period of time, and if an interval between consecutively received sensor data falls outside a threshold range of the average interval, the trigger condition may be detected.

Additionally, or alternatively, edge node 220 may detect a trigger condition by detecting a change in an amount of sensor data (e.g., a parameter) to be received from sensor device 210 at one time. For example, edge node 220 may apply a model that is configured to receive a particular amount (e.g., in bytes) of sensor data at one time, and may determine that the particular amount of sensor data received from sensor device 210 satisfies a threshold. In this case, edge node 220 may detect the change in the particular amount of sensor data based on determining that the particular amount of sensor data satisfies the threshold.

Additionally, or alternatively, edge node 220 may detect a trigger condition by detecting a change in a time of delivery (e.g., a parameter) of the sensor data. For example, edge node 220 may apply a model that is configured to receive sensor data at a particular time (e.g., an interval of five minutes), and may determine that the sensor data is received at a different time by comparing time stamps associated with incoming sensor data. As an example, edge node 220 may determine an interval associated with receiving the sensor data by comparing a time stamp for a first transmission of sensor data and a time stamp for a second transmission of sensor data, and may detect the change in the time of delivery of the sensor data based on determining that the interval is different than the particular time that the model is configured to receive sensor data.

Additionally, or alternatively, edge node 220 may detect a trigger condition by detecting a change in an entity being monitored in association with the sensor data. For example, edge node 220 may compare a first entity identifier, that identifies the entity being monitored in association with the sensor data, and a second entity identifier associated with the model. In this case, edge node 220 may determine that the first entity identifier is different from the second entity identifier, and may detect the change in the entity based on determining that the first entity identifier is different from the second entity identifier. As an example, edge node 220 may receive sensor data that includes a metadata tag indicating that the sensor data is associated with entity A (e.g., a person, such as a patient at a hospital, a machine, a geographic location, an object, etc.). In this case, if the entity associated with the model is entity B, then edge node 220 may determine that the trigger condition is detected.

In some implementations, edge node 220 may detect a trigger condition associated with a combination of parameters and/or entities. For example, edge node 220 may detect a trigger condition by detecting a change in two or more parameters and/or entities, and may detect the changes in the same manner described above.

By detecting a trigger condition, edge node 220 identifies situations where the model may be insufficient to analyze the sensor data, allowing edge node 220 to conserve processing resources and/or memory resources. For example, edge node 220 may conserve processing resources and/or memory resources by not analyzing sensor data that the model is unable to properly process, and may make efficient use of overall network resources by transmitting a request to cloud server 230 to update the model, as described further herein. Additionally, or alternatively, edge node 220 identifies situations where the model may analyze sensor data inaccurately, and requests an update to the model so that edge node 220 can accurately analyze the sensor data.

Additionally, or alternatively, edge node 220 may determine whether a change associated with the trigger condition complies with a set of domain-specific rules. For example, the set of domain-specific rules may identify a range of acceptable values for a parameter, and if the sensor data includes a value for the parameter that is outside of the acceptable range, then a model update is not triggered, despite the trigger condition being satisfied.

In some cases, edge node 220 may identify a domain-specific rule associated with a domain, and may determine whether the sensor data satisfies the domain-specific rule. For example, edge node 220 may determine a domain associated with the sensor data, and may identify a domain-specific rule associated with the domain, by accessing information included in the sensor data (e.g., a domain identifier, a domain-specific rule associated with the domain identifier, etc.). Edge node 220 may determine whether the sensor data satisfies the domain-specific rule by comparing the sensor data and the domain-specific rule to determine if the parameter is within an acceptable range of values associated with the domain-specific rule. If the sensor data is within the acceptable range of values associated with the domain-specific rule, edge node 220 may transmit a request to update the model based on determining that the sensor data satisfies the domain-specific rule. If the sensor data is not within the acceptable range of values associated with the domain-specific rule, edge node 220 may not transmit the request to update the model, even if the trigger condition is otherwise satisfied.

By determining whether the sensor data satisfies a set of domain-specific rules, edge node 220 conserves processing resources and network resources that may otherwise be used to request and update the model based on inaccurate sensor data.

As an example, assume that edge node 220 uses a model to monitor body temperature of a first patient in a hospital. In this case, assume that edge node 220 receives, from sensor device 210, sensor data that includes a type of data associated with a body temperature for a second patient in the hospital. Further assume that edge node 220 stores a domain-specific rule for monitoring body temperature, which indicates that a human body temperature must be between 90 degrees Fahrenheit and 115 degrees Fahrenheit. However, if the sensor data indicates a body temperature level of 120 degrees Fahrenheit, edge node 220 may interpret this sensor data as an error and may not request to update the model (despite the trigger condition being satisfied due to receiving sensor data associated with the second patient).

As further shown in FIG. 4, process 400 may include transmitting a request to update the model based on detecting the trigger condition (block 430). For example, the detection of the trigger condition may indicate to edge node 220 that the model lacks the configuration needed to properly analyze the sensor data, and as a result, edge node 220 may transmit, to cloud server 230, a request to update the model (to obtain an update to the model).

In some implementations, edge node 220 may modify (e.g., increase, decrease, etc.) a frequency with which the sensor data is transmitted to cloud server 230. For example, edge node 220 may automatically increase a frequency of transmission when edge node 220 requests to update a model. This may increase the rate at which cloud server 230 is able to receive the sensor data needed to update the model. In some cases, edge node 220 may wait until receiving an instruction from cloud server 230 to increase a frequency of transmission. Additionally, or alternatively, edge node 220 may modify the frequency with which the sensor data is received from sensor device 210. For example, edge node 220 may send, to sensor device 210, a request for sensor data, a request to increase the frequency with which sensor device 210 transmits sensor data, or the like. By requesting to update the model when the sensor data changes, edge node 220 provides for efficient use of network resources and cloud computing resources by utilizing cloud server 230 only when a task is required that edge node 220 may be unable to handle.

In some implementations, edge node 220 may cause the model to be updated based on detecting the trigger condition. For example, edge node 220 may detect the trigger condition, which may cause edge node 220 to update the model. In some cases, edge node 220 may determine that the trigger condition is associated with a change in a parameter that edge node 220 can update (e.g., a change in a parameter that can be updated without using extensive processing resources). In other cases, a change in a parameter may require multiple actions to update the model, and edge node 220 may perform some of the actions (e.g., actions that may not require extensive use of processing resources), while transmitting a request to update the model to cloud server 230 to perform other actions (e.g., actions that may require extensive use of processing resources).

As further shown in FIG. 4, process 400 may include receiving an updated model based on transmitting the request to update the model (block 440). For example, edge node 220 may receive, from cloud server 230, the updated model that allows edge node 220 to analyze sensor data associated with the trigger condition. In this case, cloud server 230 may update (or generate) the model by receiving additional sensor data associated with the trigger condition, and analyzing the additional sensor data based on historical data and/or collaborative data, a set of domain-specific rules, a training window, and/or the like, and may transmit the updated model to edge node 220.

In some implementations, cloud server 230 may update the model based on historical data and/or collaborative data. Historical data may include past sensor data associated with a particular entity (e.g., a particular patient associated with the model being updated), and collaborative data may include past sensor data associated with different entities (e.g., not associated with the model being updated) that share one or more characteristics with the particular entity (e.g., an entity that shares a similar type of measured data, an entity that shares a similar age, background, demographics, etc.). In some cases, cloud server 230 may query a data structure for historical data and/or collaborative data, and may update the model using the query search results. In this case, cloud server 230 may use information included in the sensor data as the search query term (e.g., an entity identifier), and cloud server 230 may search the data structure for corresponding information (e.g., a corresponding entity identifier) that may indicate that the entity has historical data for the type of data being measured. If cloud server 230 determines that the entity has historical data for the type of data being measured, the historical data may be used to update the model.

If cloud server 230 determines that the entity does not have historical data for the type of data being measured, the collaborative data may be used to update the model. In this case, cloud server 230 may use information included in the sensor data as the search query term (e.g., information regarding one or more characteristics), and cloud server 230 may search the data structure for corresponding information (e.g., information regarding one or more corresponding characteristics) that may indicate that there is historical data and/or collaborative data for the type of data being measured. Cloud server 230 may use the historical data and/or the collaborative data to update the model.

Additionally, or alternatively, cloud server 230 may update the model using the set of domain-specific rules. For example, the set of domain-specific rules may allow cloud server 230 to update the model by interpreting the sensor data in a particular manner. In some cases, cloud server 230 may apply the set of domain-specific rules to the sensor data, which may allow cloud server 230 to interpret the sensor data in different ways, depending on context.

As an example, assume edge node 220 applies a model that is configured to analyze body temperature, and that edge node 220 receives sensor data that includes a type of data relating to measuring glucose levels, and a type of data relating to an amount of time that has passed since a patient's last meal. Further assume that this satisfies the trigger condition, and that edge node 220 transmits a request to update the model. In this case, cloud server 230 may apply a set of domain-specific rules relating to glucose levels to the sensor data, and may classify a glucose level associated with the sensor data as postprandial blood sugar or fasting blood sugar based on the amount of time that has passed since the patient's last meal. Classifying glucose levels associated with the sensor data as postprandial blood sugar or fasting blood sugar allows cloud server 230 to accurately update the model based on context. By updating the model with the set of domain-specific rules, edge node 220 is able to properly analyze the sensor data within the context of that particular domain.

Additionally, or alternatively, edge node 220 may receive, from cloud server 230, information identifying a training window. The training window may indicate a frequency with which the sensor data is to be transmitted to cloud server 230 and/or a length of time that sensor data is to be transmitted to cloud server 230. For example, cloud server 230 may determine the training window by monitoring a frequency at which requests to update the model are received. By training the model on the cloud server 230 (e.g., using an optimized training window and/or constraint satisfaction), edge node(s) 220 may conserve processing resources that would otherwise be used to train the model, thereby making edge node(s) 220 capable of analyzing large volumes of sensor data for fog computing.

In some cases, sensor data may change frequently, leading to a high frequency of requests to update the model. This may be an indicator that a shorter training window is needed, because edge node 220 may need to apply the updated model before a subsequent change to the sensor data is detected. In other cases, sensor data may change infrequently, leading to a low frequency of requests to update the model. This may be an indicator that a larger training window may be used, which may conserve network resources by allowing edge node 22 to wait until a period of low network traffic to transmit the sensor data needed to update the model. While cloud server 230 is waiting for the sensor data needed to update the model, edge node 220 may store the sensor data, even if edge node 220 lacks the updated model needed to properly analyze the sensor data. When edge node 220 receives the training window, edge node 220 may set the frequency with which the sensor data is to be transmitted to cloud server 230 to the training window, and/or the length of time that sensor data is to be transmitted to cloud server 230.

By receiving the updated model based on historical data, collaborative data, a set of domain-specific rules, and/or a training window, edge node 220 is able to properly analyze the sensor data.

As further shown in FIG. 4, process 400 may include applying the updated model to the sensor data and/or to subsequent sensor data received from the sensor device or another sensor device (block 450). For example, edge node 220 may apply the updated model to the sensor data and/or to the subsequent sensor data received from one or more sensor devices 210 (e.g., sensor device 210, or another sensor device 210 if the trigger condition is associated with a change in sensor device), which may allow edge node 220 to properly analyze the sensor data. In this case, after receiving the updated model, edge node 220 may automatically decrease a frequency at which the data is to be transmitted to cloud server 230. By automatically decreasing the frequency at which the sensor data is transmitted to cloud server 230 when the updated model is received, edge node 220 conserves processing resources by only transmitting data at a high frequency when a model needs to be updated.

In some implementations, edge node 220 may perform one or more actions based on applying the model. For example, edge node 220 may perform an action by analyzing the sensor data associated with the updated model, and may provide the analyzed sensor data to user device 250. For example, in certain domains (e.g., medical, industrial etc.), it may be advantageous to provide the sensor data to user device 250 for a human analysis. As an example, edge node 220 may provide sensor data associated with a medical-related parameter (e.g., a heart rate measurement) to user device 250 (e.g., a Doctor's computer), and this may allow a user (e.g., the Doctor) to determine whether the medical-related parameter associated with the sensor data is in a normal condition or a critical condition.

Additionally, or alternatively, edge node 220 may perform an action by updating one or more sensor devices 210. For example, edge node 220 may update a sensor device 210 by detecting an error associated with the sensor data and providing an instruction (e.g., to sensor device 210, to user device 250, to a domain-specific device, to a different device, etc.) to cause sensor device 210 to recalibrate, reboot, power down, and/or the like and/or to cause another sensor device 210 to power up, to be calibrated, to be configured, and/or the like. As an example, edge node 220 may determine that the sensor data satisfies an error threshold, and may provide an instruction to user device 250 based on determining that the sensor data satisfies the error threshold.

Additionally, or alternatively, edge node 220 may perform an action by analyzing the sensor data associated with the updated model, and may automatically provide an instruction, to a domain-specific machine, based on the analyzed sensor data. For example, edge node 220 may be configured to automatically provide an instruction to a domain-specific machine when a condition associated with the sensor data is satisfied. As an example, edge node 220 may analyze sensor data associated with an updated model, and the sensor data may include a data type relating to a heart rate measurement. In this case, edge node 220 may be configured to automatically provide an instruction (e.g., an alert) to a life support system, or a related medical device, if the condition associated with the heart rate measurement is satisfied.

In some implementations, cloud server 230 may transmit a command that overrides an instruction and/or information provided by an edge node 220 to a sensor device 210. For example, edge node 220 may generate an instruction that is outdated or inaccurate (e.g., because edge node 220 does not have a holistic view of data, whereas cloud server 230 does). In this case, cloud server 230 may receive the instruction from edge node 220, may determine that the instruction is outdate or inaccurate (e.g., by analyzing data stored by cloud server 230), and may transmit a command to override the instruction. In this case, edge node 220 may receive the command from cloud server 230, and may provide the command to sensor device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. While process 400 may have referred to one or more sensor devices 210 associated with an entity, in practice, implementations described herein may include multiple sensor devices associated with each entity, a single sensor device 210 associated with multiple entities, and/or the like.

By dynamically updating a model based on changes to the sensor data, edge node 220 efficiently utilizes network resources. For example, if edge node 220 does not detect a change in the sensor data, edge node 220 may use processing resources and/or memory resources to analyze the sensor data. However, if edge node 220 does detect a change in the sensor data, edge node 220 may conserve processing resources and/or memory resources and transmit a request to cloud server 230 to update the model. Furthermore, edge node 220 conserves network resources and/or cloud computing resources by not requesting an unnecessary update to the model.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive sensor data from one or more sensor devices;
detect a trigger condition, that triggers an update to a model used to analyze the sensor data, based on receiving the sensor data,
the trigger condition including at least one of:
a change in a type of data included in the sensor data,
a change in an entity being monitored in association with the sensor data, or
a change in a frequency with which the sensor data is received from the one or more sensor devices;
transmit, to a cloud server device, a request to update the model based on detecting the trigger condition;
receive, from the cloud server device, an updated model based on transmitting the request to update the model; and
apply the updated model to the sensor data and/or subsequent sensor data received from the one or more sensor devices.

2. The device of claim 1, where the one or more processors, when detecting the trigger condition, are to:
compare a type of data included in the sensor data and one or more types of data associated with the model;
determine that the type of data is not included in the one or more types of data; and
detect the change in the type of data based on determining that the type of data is not included in the one or more types of data.

3. The device of claim 1, where the one or more processors, when detecting the trigger condition, are to:
compare a first entity identifier, that identifies the entity being monitored in association with the sensor data, and a second entity identifier associated with the model;
determine that the first entity identifier is different from the second entity identifier; and
detect the change in the entity based on determining that the first entity identifier is different from the second entity identifier.

4. The device of claim 1, where the one or more processors, when detecting the trigger condition, are to:
determine a time interval associated with receiving the sensor data;
determine that the time interval satisfies a threshold; and
detect the change in the frequency based on determining that the time interval satisfies the threshold.

5. The device of claim 1, where the one or more processors are further to:
determine a domain associated with the sensor data;
identify a domain-specific rule associated with the domain;
determine that the sensor data satisfies the domain-specific rule; and
where the one or more processors, when transmitting the request, are to:
transmit the request based on determining that the sensor data satisfies the domain-specific rule.

6. The device of claim 1, where the one or more processors are further to:
modify a frequency with which the sensor data is transmitted to the cloud server device.

7. The device of claim 1, where the one or more processors are further to:
receive information identifying a training window,
the training window indicating a frequency with which additional sensor data is to be transmitted to update the model; and
transmit the additional sensor data, to update the model, based on the training window.

8. A method, comprising:
receiving, by an edge node in a decentralized system, sensor data from a sensor device;

detecting, by the edge node, a trigger condition that triggers an update to a model used to analyze the sensor data, based on receiving the sensor data,
the trigger condition including at least one of:
a change in a type of data included in the sensor data,
a change in a frequency with which the sensor data is received from the sensor device, or
a change in an entity being monitored in association with the sensor data;
causing, by the edge node, the model to be updated based on detecting the trigger condition,
the model being updated by transmitting a request to a cloud computing device in the decentralized system;
applying, by the edge node, the updated model to the sensor data and/or subsequent sensor data; and
performing, by the edge node, one or more actions based on applying the model.

9. The method of claim 8, where the trigger condition includes at least one of:
a change in an amount of sensor data, or
a change in a time of delivery of the sensor data.

10. The method of claim 8, where performing the one or more actions comprises:
providing the sensor data and/or the subsequent sensor data to a user device.

11. The method of claim 8, where performing the one or more actions comprises:
updating the sensor device.

12. The method of claim 8, where performing the action comprises:
determining that the sensor data and/or the subsequent sensor data satisfies a threshold; and
providing an instruction, to a domain-specific device, based on determining that the sensor data and/or the subsequent sensor data satisfies the threshold.

13. The method of claim 8, where the sensor data is received from a plurality of sensor devices associated with the entity,
the plurality of sensor devices including the sensor device.

14. The method of claim 8, further comprising:
receiving information identifying a training window,
the training window indicating a frequency with which additional sensor data is to be transmitted to update the model; and
transmitting the additional sensor data, to update the model, based on the training window.

15. A non-transitory computer-readable medium storing instructions, the instructions comprising:
one or more instructions that, when executed by one or more processors, cause the one or more processors to:
receive sensor data from one or more sensor devices;
detect a trigger condition, that triggers an update to a model used to analyze the sensor data, based on receiving the sensor data,
the trigger condition including at least one of:
a change in a type of data included in the sensor data,
a change in an entity being monitored in association with the sensor data, or
a change in a frequency with which the sensor data is received from the one or more sensor devices;
obtain an updated model based on detecting the trigger condition,
where the one or more instructions, that cause the one or more processors to obtain the updated model, cause the one or more processors to:
transmit, to a cloud server device, a request to update the model based on detecting the trigger condition, and
receive, from the cloud server device, the updated model based on transmitting the request to update the model; and
apply the updated model to the sensor data and/or subsequent sensor data received from the one or more sensor devices.

16. The non-transitory computer-readable medium of claim 15, where the one or more instructions, that cause the one or more processors to detect the trigger condition, cause the one or more processors to:
compare a type of data included in the sensor data and one or more types of data associated with the model;
determine that the type of data is not included in the one or more types of data; and
detect the trigger condition based on determining that the type of data is not included in the one or more types of data.

17. The non-transitory computer-readable medium of claim 15, where the one or more instructions, when executed by the one or more processors, further cause the one or more processors to:
modify the frequency with which sensor data is received from the sensor device; or
modify a frequency with which the sensor data is transmitted to a cloud server.

18. The non-transitory computer-readable medium of claim 15, where the one or more instructions, when executed by the one or more processors, further cause the one or more processors to:
receive information identifying a training window,
the training window indicating a frequency with which additional sensor data is to be transmitted to update the model; and
transmit the additional sensor data, to update the model, based on the training window.

19. The non-transitory computer-readable medium of claim 15, where the one or more instructions, that cause the one or more processors to obtain the updated model, cause the one or more processors to:
generate the updated model based on detecting the trigger condition.

20. The non-transitory computer-readable medium of claim 15, where the one or more instructions, further cause the one or more processors to:
determine that the sensor data and/or the subsequent sensor data satisfies a threshold; and
provide an instruction, to a domain-specific device, based on determining that the sensor data and/or the subsequent sensor data satisfies the threshold.

* * * * *